United States Patent
Omansky et al.

(10) Patent No.: US 8,022,816 B2
(45) Date of Patent: Sep. 20, 2011

(54) SYSTEM AND METHOD FOR FIELD MANAGEMENT USING RADIO FREQUENCY TAGS

(75) Inventors: Adam H. Omansky, Cambridge, MA (US); Joshua L. Kanner, Cambridge, MA (US)

(73) Assignee: Vela Systems, Inc., Cambridge, MA (US)

( * ) Notice: Subject to any disclaimer, the term of this patent is extended or adjusted under 35 U.S.C. 154(b) by 1176 days.

(21) Appl. No.: 11/384,926

(22) Filed: Mar. 20, 2006

(65) Prior Publication Data

US 2006/0253492 A1 Nov. 9, 2006

Related U.S. Application Data

(60) Provisional application No. 60/663,460, filed on Mar. 21, 2005.

(51) Int. Cl.
*G08C 19/12* (2006.01)
(52) U.S. Cl. .............. 340/13.26; 340/10.1; 705/28
(58) Field of Classification Search ............. 340/10.1, 340/10.2, 10.3, 870.03, 527, 528, 539.11, 340/539.13, 3.2, 825.2, 5.21, 13.26; 705/7, 705/8, 9, 10, 11, 30, 34, 28
See application file for complete search history.

(56) References Cited

U.S. PATENT DOCUMENTS

| | | | | |
|---|---|---|---|---|
| 5,774,876 A | * | 6/1998 | Woolley et al. | 705/28 |
| 5,930,764 A | * | 7/1999 | Melchione et al. | 705/7.29 |
| 5,963,134 A | * | 10/1999 | Bowers et al. | 340/572.1 |
| 6,148,291 A | * | 11/2000 | Radican | 705/28 |
| 6,275,153 B1 | * | 8/2001 | Brooks | 340/568.6 |
| 6,285,931 B1 | * | 9/2001 | Hattori et al. | 701/29 |
| 6,411,817 B1 | * | 6/2002 | Cheng et al. | 455/522 |
| 6,614,351 B2 | * | 9/2003 | Mann et al. | 340/572.1 |
| 6,662,210 B1 | | 12/2003 | Carleton et al. | |
| 6,796,505 B2 | * | 9/2004 | Pellaumail et al. | 235/462.13 |
| 6,819,222 B2 | * | 11/2004 | Lin et al. | 340/10.31 |
| 6,870,480 B2 | * | 3/2005 | Suzuki et al. | 340/679 |
| 6,895,330 B2 | * | 5/2005 | Cato et al. | 701/209 |

(Continued)

OTHER PUBLICATIONS

Entrepreneurship Plan for The RFiD Smart-Tag Punch List: The Application of Logistics Technology in Construction and Capital Projects Closeout Quality Control and Operations & Maintenance; MIT Construction Engineering and Management—Spring 2005; Adam H. Omansky—Mar. 8, 2005.

(Continued)

*Primary Examiner* — Daniel Wu
*Assistant Examiner* — Rufus Point
(74) *Attorney, Agent, or Firm* — Mark Leonardo; Adam Schoen; Brown Rudnick LLP (57) ABSTRACT

A system and methods are provided for field administration of a project, such as construction, maintenance, safety inspections or other projects involving the tracking of issues and one or more levels of review or approval in the closure of the issues. One or more radio frequency tags, each having an identifier, can be affixed to a physical component of a project. A storage device can store an issue list, wherein the issue list has one or more work items corresponding to the physical component of the project on which the radio frequency tag is affixed. User interfaces may be provided to allow interaction by stationary or mobile users with the issue list. The issue list on the storage device may provide better organization and/or a more efficient work flow, particularly during a close-out phase, or other phase of a project, involving the tracking of issues.

21 Claims, 6 Drawing Sheets

U.S. PATENT DOCUMENTS

| | | | |
|---|---|---|---|
| 6,954,737 B2 * | 10/2005 | Kalantar et al. | 705/50 |
| 7,035,814 B2 * | 4/2006 | Malkin et al. | 705/23 |
| 7,042,468 B2 * | 5/2006 | Schwegler et al. | 345/629 |
| 7,070,091 B2 * | 7/2006 | Hepworth et al. | 235/375 |
| 7,340,314 B1 * | 3/2008 | Duncan et al. | 700/83 |
| 7,409,392 B2 * | 8/2008 | Greer et al. | 1/1 |
| 2001/0008390 A1 * | 7/2001 | Berquist et al. | 340/10.31 |
| 2001/0030232 A1 * | 10/2001 | Piatek | 235/375 |
| 2002/0084889 A1 * | 7/2002 | Bolavage et al. | 340/10.1 |
| 2003/0050871 A1 * | 3/2003 | Broughton | 705/28 |
| 2003/0135285 A1 * | 7/2003 | Osterkamp | 700/11 |
| 2003/0164779 A1 * | 9/2003 | Gieseke et al. | 340/993 |
| 2003/0216969 A1 * | 11/2003 | Bauer et al. | 705/22 |
| 2003/0227385 A1 * | 12/2003 | Lancaster | 340/572.1 |
| 2004/0227974 A1 | 11/2004 | Hatashita | |
| 2005/0065830 A1 * | 3/2005 | Duke et al. | 705/7 |
| 2005/0246217 A1 * | 11/2005 | Horn | 705/9 |
| 2006/0064434 A1 | 3/2006 | Gilbert et al. | |
| 2006/0069890 A1 * | 3/2006 | Cox et al. | 711/162 |
| 2006/0136441 A1 | 6/2006 | Fujisaki | |
| 2006/0176177 A1 * | 8/2006 | Heinze et al. | 340/572.1 |
| 2006/0229928 A1 * | 10/2006 | Nix | 705/9 |
| 2006/0267756 A1 * | 11/2006 | Kates | 340/521 |
| 2007/0017983 A1 * | 1/2007 | Frank et al. | 235/385 |
| 2007/0100677 A1 * | 5/2007 | Boss et al. | 705/9 |
| 2007/0119916 A1 * | 5/2007 | Roewer | 235/376 |

OTHER PUBLICATIONS

An RFiD Smart-Tag Punch List: The Application of Supply Chain Logistics Technology in Project Closeout Quality Control; Harvard Design School 7411-Fall 2004; Adam H. Omansky—Jan. 12, 2005.

* cited by examiner

SYSTEM AND METHOD FOR FIELD MANAGEMENT USING RADIO FREQUENCY TAGS

RELATED APPLICATIONS

This application claims the benefit of U.S. application Ser. No. 60/663,460, filed Mar. 21, 2005, entitled Radio Frequency Identification Tag Application For Quality Control, Operations & Maintenance, And Turnaround Of Construction And Capital Projects, which is incorporated herein by reference.

BACKGROUND

A strategic closeout process is involved in the success of any construction or capital project. In general, a disproportionate amount of time and cost is required to produce relatively marginal progress toward "perfection," as a measurable degree of quality, in both the current standard and non-standard project delivery methods. Time and cost expenditures, to address quality control during the construction process and closeout phases, can be a balance between the disparate interests of the stakeholders and related parties: owners, developers, capital partners and equity investors, operators, architects, consulting engineers, contractors, sub-contractors, vendors, etc. Attaining the quality established in the contract documents, and demanded by the architect, consulting engineers, and other designers, can jeopardize both the schedule and the budget.

The current, industry-standard quality control and closeout workflow process, in general, provides that stakeholders employ manual means and methods during the quality control and closeout process. In one example, stakeholders inspect the work and generate issue lists and related reports and protocols by hand, using traditional paper and pen, a laptop, or tape recorder or digital audio recording device. Administrators transfer the data and meta-data, from the in-situ inspections to a paper or electronic document, usually a spreadsheet. In most projects each stakeholder, including the general contractor, sub-contractors, architect, and consulting engineers, manages a separate document, distinct and insulated from the other parties. The result: a non-productive working environment, plagued by wasted expenditures of time and energy, and increased stress and strife. The accuracy and integrity of information is often neither dependable nor verifiable at any given moment in time.

SUMMARY

Embodiments of the present invention may be used in a wide variety of field administration applications, e.g. those involving the tracking of issues and one or more levels of review or approval in the closure of the issues. Examples include, but are not limited to: the construction and capital project areas such as commercial buildings, residential buildings, non-residential buildings, non-building structures, such as marine, off-shore, power, and process industry segments; safety inspections; facility maintenance and various observation and inspection tasks, start-up activities, pre-commissioning, commissioning, testing, adjusting, balancing, operations, maintenance, service, repair and turnaround of work.

According to one illustrative embodiment of the invention, a system for field administration of a project includes a radio frequency tag having an identifier and adapted to be affixed to at least one physical component of the project. The radio frequency tag is capable of transmitting the identifier via a radio frequency transmission. A receiver is provided that is capable of receiving the identifier transmitted via a radio frequency transmission. A storage device stores an issue list. The issue list includes at least one work item corresponding to the physical component of the project on which the radio frequency tag is affixed. A first user interface enables a first party to view the at least one work item and indicate completion of an activity corresponding to the at least one work item, thereby signifying closure of the at least one work item. A second user interface enables a second party to view a status of the at least one work item and accept or reject the closure of the at least one work item.

In another illustrative embodiment of the invention, a method of field administration of a project is provided. The method includes the acts of affixing a radio frequency tag having an identifier to a physical component of the project. The identifier is transmitted from the radio frequency tag via a radio frequency transmission. The identifier is received at a first mobile computing device. Information associated with the identifier is input into the first mobile computing device relating to a deficiency in the physical component. The information and the identifier are transmitted from the first mobile computing device to a storage device. The information and identifier are stored in the storage device.

According to a further illustrative embodiment of the invention, another method of field administration of a project is provided. In this method, a plurality of radio frequency tags, each having a unique identifier, are affixed to a plurality of physical components of the project. Each tag is capable of transmitting a unique identifier. The unique identifier is transmitted from at least one radio frequency tag via a radio frequency transmission. At least one unique identifier is received at a mobile computing device. Information relating to the physical component of the project and associated with the at least one unique identifier is received from a stationary storage device.

According to another embodiment of the invention, a method is provided including the acts of associating an identifier of a radio frequency tag to a physical component of a project and creating a work item on an issue list. The work item is associated with the identifier and related to a deficiency in the physical component. A first comment corresponding to the work item is input. The first comment is associated with the identifier. The method also includes displaying the first comment in relation to an inquiry pertaining to the identifier.

BRIEF DESCRIPTION OF THE DRAWINGS

The invention will be apparent from the description herein and the accompanying drawings.

DETAILED DESCRIPTION

According to various embodiments of the invention, radio frequency (RF) tags are used to uniquely identify various project components and may be used with an issue list located on a storage device to provide an inventory of the deficiencies of the project components, which may be described as physical work to be completed and/or corrected. Various embodiments of the invention may create static and/or dynamic information links, between the deficiencies and an extranet or shared database, via wireless connections and/or radio waves. The invention's use of RF technology may streamline the project quality control, closeout, and lifecycle process, in the best interests of project stakeholders.

According to an example of the invention, during a field inspection, the contractor, sub-contractor, architect, consulting engineer, or other party identifies a deficient component of the project, obtains a tag's identifier with a receiver, such as a mobile computing device, and adheres the tag to the physical object. One RF tag can relate to one deficiency, or one room or one area with multiple deficiencies, depending on the need. Optionally in real-time, the mobile computing device communicates the data about the deficient work to an issue list on a storage device accessible to all of the connected parties, either on or off site. The issue list itself may become live and direct, an active force to propel the quality control and closeout process. Various embodiments of the invention may transform the issue list to an integrated networking technology. When the sub-contractor or vendor addresses the deficiency, the issue list is updated by the use of the RF identifier as a reference to the deficiency.

The standard contract closeout inspection procedure is congested with layers of formal invitations, inspections, document transmissions, and related protocols. Various embodiments of the invention may change the workflow, from a linear, sequential process to parallel, simultaneous workflow. By way of contrast, a typical project closeout process may be as follows.

On some projects with a high budget and/or a high cost of construction, and with a high degree of complexity and/or non-standard means and methods of construction, such as a mega-hotel or mixed-use complex for example, the issue list can contain thousands to tens of thousands of items of work. Management and implementation of the thousands of items of work, in cooperation with the sub-contractors and the vendors, and in strict accordance with the contract documents, can require months of time, at a phase in the project when the stakeholders can least afford any delays. To complicate matters, the plethora of work in the quality control and closeout phase resides in the details, which can be very laborious to locate and to track. When the issue list item requires work by multiple sub-contractors and/or vendors, the general contractor can face major problems to recall the trades back to the project site, to coordinate and to sequence the execution of the work in a timely manner, and to verify the work when completed or corrected; accountability can be very problematic in areas with multiple trades.

When presented with the tradeoff between compliance with the schedule or the standard of quality, the owner, in the majority of cases, sacrifices quality in favor of time. Relinquishing selected contractual rights, as part of a negotiated, pre-handover settlement, is not uncommon in complex, modern-day projects. In return for an agreement to compromise on quality, the owner deducts a pre-determined or a negotiated sum of money from the contractor's fee. The contractor needs to finish the job, and the owner needs to occupy and to use the space for its intended use. Neither party is interested in engaging first in mediation, second in formal arbitration, and third in adjudication or litigation.

A zero-sum game not a plus-sum game, all parties lose to meet the deadline. The owner and architect sacrifice quality, and the contractor suffers a reduction in fee. "End-game" tradeoff negotiations can instigate disputes, at a period when cooperation and collaboration, not conflict, is fundamental. Focus shifts to non-constructive activities, and to re-negotiation of the general contract. Focus should be on the construction work. If not well-managed, a project with a sound start and a fluid construction process can fail in the end-game. In practice, the standard contract closeout process does not always support the interests of the stakeholders, in particular when financial sustenance and reputation is at stake.

With the ever-increasing complexity of modern-day projects, thousands of issue list items significantly impede the momentum of the work, in the end-phase of the job, between substantial completion and final acceptance of the contract. Final acceptance is the stage in the contract when the contracting officer determines that all work has been 100 percent completed according to the terms and conditions of the contract documents, including administrative obligations. As the contractor is at the peak of the learning curve, toward the end of the project, in theory, the remaining 5% or thereabouts of the work will take proportionately less time to execute. In practice however, the remaining 5% to 10% or thereabouts of the work can require significantly more time, jeopardizing deadlines. The subsequent handover to and final acceptance by the owner, operators and other end-users can be compromised. If the project team misses the final acceptance deadline, the contractor can incur severe liquidated damages, payable to the owner. The owner can suffer a loss of revenue from a lack of operations, penalties from commercial banks and other lending institutions, and perhaps scandal from shareholders and the general public.

As a legal record, the substantial completion inspection list functions as the means and method to communicate all items to be completed and corrected, before the owner, owner's agent, architect or other contracting officer can accept the work as 100% complete. Final acceptance entitles the contracting officer to issue the final certificate for payment, co-signed by the architect, contractor and owner. Final payment, plus hold-backs by the owner, motivates the contractor to complete the final work, often about 5% or thereabouts, depending on the conditions of the project.

When the issue list inspection process is completed by the contractor, sub-contractors, and the architect, the parties acknowledge in writing that the work is substantially complete. The contractor agrees in writing to complete and correct all outstanding work. Accordingly, the owner accepts in writing to assume full possession of the work, or designated portion thereof. Depending on the conditions of the contract for construction, the contractor may transfer responsibility for security, maintenance, and insurance to the owner. Parties sign-off on the date of substantial completion of the project, and applicable warranties commence, as required by the contract documents.

Attached to the certificate of substantial completion, the issue list quantifies the outstanding physical work, in a legal format, for short-term use and long-term record. By defining the scope of the outstanding work for the sub-trades, the issue list benefits the contractor. In high-liability projects, such as condominiums where individual owners demand a high standard of quality, the issue list helps to protect against future litigation. Serving future owners, the issue list also acts as the vehicle to help ensure that the contractor delivers the degree of quality established in the contract documents. Supplementary to the certificate of substantial completion, the issue list provides a checks-and-balances system to the final 5% to 10%, or thereabouts, of the project delivery process, with respect to the distinct interests of all of the stakeholders and other project parties.

The project closeout period, between the dates of substantial completion and final acceptance, presents legal obligations for both the contractor and the owner. Between substantial completion and final acceptance, the contractor demobilizes or "ramps down," and the owner mobilizes or "ramps up." The owner and the contractor simultaneously occupy the space, which sometimes instigates conflict. The owner has the right to utilize the space for its intended use, as the contractor completes the issue list work prior to final acceptance. The owner and contractor may use the changeover period to train the owner's facility manager in general operations. Contracts can also call for the demonstration to and the training of the owner's personnel, in the operation, adjustment, and maintenance of products, equipment, and systems, as a pre-requisite of substantial completion.

Submitting a final application for payment reaffirms the due date for handover in accordance with the contract, and the respective obligations between the owner and the contractor. The contractor may also be required to submit: evidence that all record documents, operation and maintenance manuals, warranties and similar required submittals are approved; final sub-contractor payment forms; evidence of final, continuing insurance coverage; record as-built contract schedule; warranty book; etc. Before the contractor can request the final inspection, to determine the date of final acceptance, the contractor needs to submit a certified copy of the substantial completion inspection list or issue list, endorsed and dated by the contracting officer or architect. As the end-date for any liquidated damages, final acceptance is crucial to control the contractor's exposure, as responsibility transitions to the owner. At final acceptance, insurance or risk of loss shifts from the contractor to the owner. The warranty period starts. Time limitations begin for an action on a bond, for the filing of a mechanic's lien, and for exposure under statutes of limitations and repose. The issue list becomes the essential "driver" of the end-game, as events hinge upon the completion, and the subsequent certification of completion of the physical work.

Figure 1:
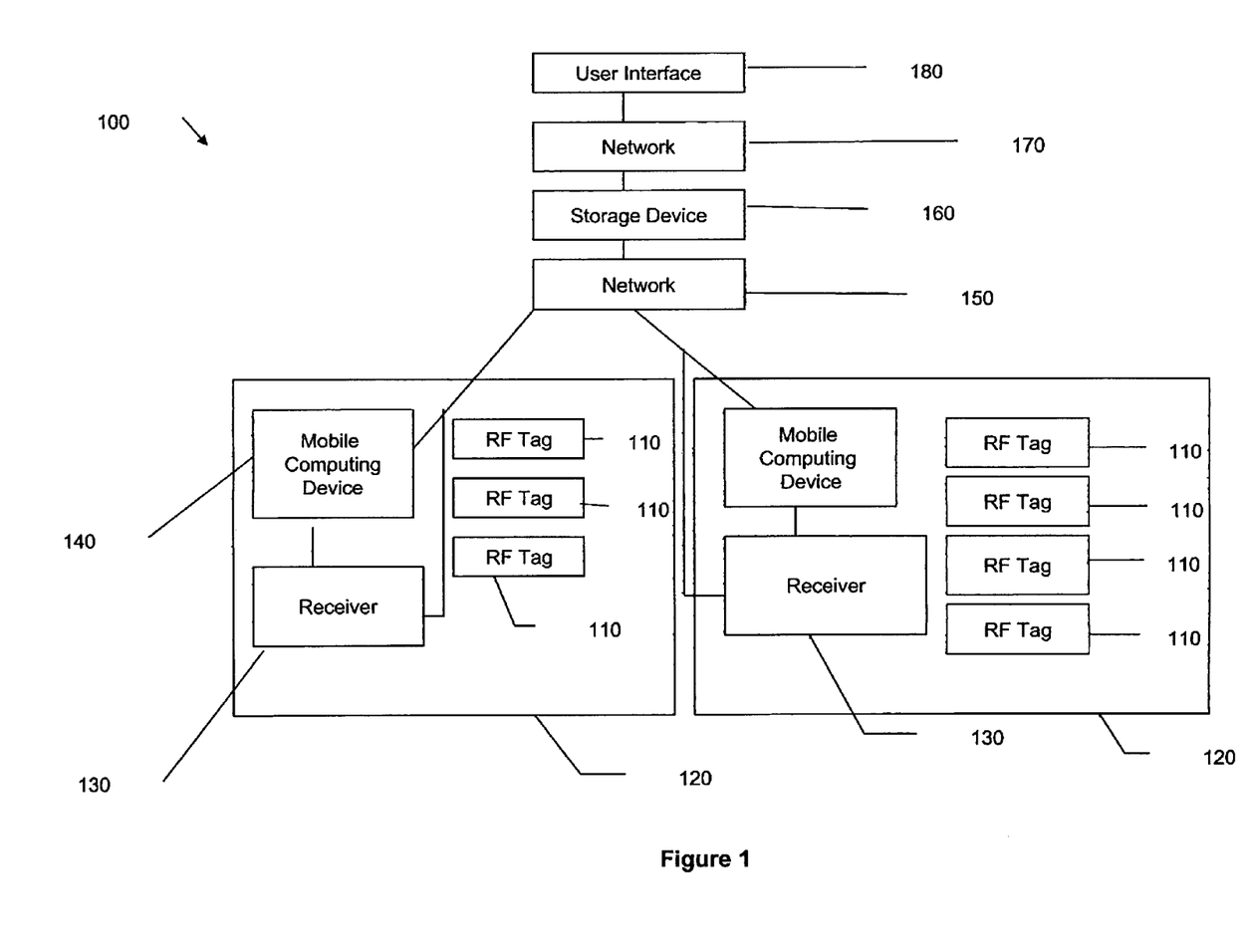
FIG. 1 is a schematic illustration of an example implementation of an embodiment to the present invention.

According to an illustrative implementation 100 of the embodiment of the invention, one or more radio frequency (RF) tags 110 are each located on a corresponding physical component of a project. The RF tag 110 may be affixed to the component of the project because the component is somehow deficient. The terms "deficient" and "deficiency" as used herein, refer to a component in need of additional work or other remedial action or inspection. As used herein, the term "affixed" is meant to designate a wide variety of actions whereby the RF tag 110 is co-located with the component. Examples include mounting the RF tag 110 by an adhesive, a removable fastener, such as a hook and loop fastener, a physical fastener, such as a nail, screw, or rivet, or simply positioning the RF tag 110 proximate to the physical component of the project.

An RF tag 110 may be a wide variety of radio frequency transmission devices or transceiver devices, capable of issuing transmissions of an identifier, optionally in response to an interrogation signal and/or a predetermined schedule. Both active RF tags, those emitting a signal from the tag's own power source, and passive RF tags, those emitting a signal based on power received from a received signal, are within the scope of the invention.

RF tags require no optical scanning; the user typically need not find the exact location of the tag, but only be within the radio range of the tag. Accordingly, RF tags may be concealed or located behind permanent construction (for example, behind a wall). RF tags may enable owners, operators, property managers, and other end-users to manage and to track operations, maintenance, service, repair, turnaround, and other related information about the work, on-the-spot of the work.

As illustrated in FIG. 1, one or more sites 120 may be used simultaneously within the scope of the invention. A site 120 may be geographically located adjacent to a near by site 120, or may be substantially geographically separated from other sites 120. One or more receivers 130 may be used on the site to receive radio frequency transmissions from the RF tags 110. The radio frequency transmissions include a unique identifier such that the RF tag 110 issuing the transmission can be distinguished from other tags by the use of the unique identifier. The receiver may optionally be a transceiver, capable of sending an interrogation signal to the RF tag 110. The receiver and RF tag 100 each have an integrated antenna or are coupled to an external antenna to enable transmission/reception as appropriate. Optionally, the radio frequency transmissions may include additional data stored by an optional remote storage capability of the RF tag 110. Examples of additional data stored by an optional remote storage capability may include all or a subset of the type of information stored on the storage device 160, described in greater detail herein.

A mobile computing device 140 may also be used on the site 120. Examples of mobile computing devices may include, but are not limited to, a laptop, a tablet personal computer, a personal digital assistant, and a smart phone. Other examples of mobile computing devices include devices having a computer processing capability, an ability to communicate with a network, and a display and/or input capability for interaction with a mobile user. In the present example, the mobile computing device 140 can communicate with a network 150. Optionally, the receiver 130 may also communicate directly with the network 150, such as by the use of stationary receivers 130 coupled to the network 150. Examples of communications may include, but are not limited to, a wireless network and a wired network, or combinations thereof. Examples of network 150 types include local area networks, such as for example, Ethernet, extranets, the Internet, Bluetooth and a wide variety of other networking protocols.

A storage device 160 as provided and configured to maintain an issue list. Examples of storage devices 160 include, but are not limited to computer servers, including those having processors and/or controllers, data storage devices such as hard drives or memory, or other devices capable of storing digital data and communicating with a network. The issue list includes the unique identifiers corresponding to the RF tags 110 and a wide variety of additional information that may be stored in association with the unique identifiers. It is understood that a wide variety of database or other memory management structures may be used within the skill in the art. Such structures may involve maintaining the unique identifiers in a separate table or structure from other information. Such structures are within the scope of the present invention. Multi-tenant computer architecture may also optionally be used, capable of supporting multiple projects concurrently while maintaining data security. In one example, the software may use standard username and password authentication via a web browser to determine the lists of projects and issues/defects that a given user may access. Therefore, each separate customer will have their own separate view of the data and not be able to access the data of other customers stored in the same database. In a further example, each customer will have a unique set of data within the shared database and each user within a customer will only have access to the information relevant to their company.

The information located on the storage device 160 in the present example would be directed toward the specifics of the physical component of the project upon which the RF tag 110 is affixed. Examples of various attributes of the information include by way of example, but are not limited to:

Multi-party Field Identification
    Example: PL-123.456.78
    Primary auto-number: report number; PL (Defect or issue list) 123
    Secondary number: room or area number; Room 456
    Tertiary auto-number: sequential item number; Item 78

Preface Metadata
    Project name and project number
    Date and time stamp of every revision on the issue
    Focus area of the report; example: Fourth Floor Function Rooms
    Status of the item, including open, new, closed, under review, reopen
    Comments section with date/time stamp General Data or Content
    Type of issue: Which may include plumbing, electrical, systems, finish or any other code in a selection list as outlined in the Subcontractor key attributes list below.
    Severity of issue: Critical, Serious, Medium, Low
    Priority of issue: High, Medium, Low
    Notes; a brief description of the work to be completed or corrected
    Responsible party: sub-contractor key
    Repair code, if applicable, for repeat problems
    Monetary value, assigned by the Contractor
    Reasons why the work is not complete, indicated by the Contractor
    Drawing or other contract document reference, if applicable
    Specification division and sub-division reference, if applicable
    Audio or other recording (photo, video) to establish record of what must be done Postscript Metadata
    Author of the report
    Signature by the Architect
    Due date to complete the work, scheduled by the Contractor Acceptance attributes
    Actual date of completion
    Signature of acceptance by the Contracting Officer, Owner's Agent, Project Manager, etc.
    Signature of acceptance by the Architect
    Signature of acceptance by the Contractor
    Audio or other recording (photo, video) to establish record of what was completed Sub-Contractor Information to Establish Type of Work to be Conducted
    A Sitework
    Earthwork/Footings
    Utilities/Sewerage/Drainage
    Waterproofing
    Paving/Landscaping
    B Elevator/Stairs
    C Structure
    Concrete
    Masonry
    Framing
    Metal work
    D Roofing/Flashing
    E Exterior Surfaces/Insulation
    F Exterior Openings/Glazing
    G Doors/Hardware
    H Plumbing/Sprinkler
    I Mechanical/HVAC
    J Electrical
    K Carpentry/Millwork
    L Finishes
    Drywall
    Flooring
    Painting
    Specialties In the present example, the mobile computing device 140 may contain a subset or a full set of the issue list stored of a storage device 160. In such a case, the mobile computing device 140 may operate locally, accepting inputs from a user and transmissions from various RF tags 110. Periodically, the mobile computing device 140 could synchronize the data stored on the mobile computing device 140 with the issue list stored on the storage device 160. Other variations are within the scope of the invention, such as, by way of non-limiting example, a mobile computing device 140 that interacts directly with the issue list located on the storage device 160, updating the issue list upon receipt or inputting of the identifiers or information at the mobile computing device 140.

An optional network 170, which may be the same as the previously mentioned network 150, or may be a different network, provides for communication between the storage device 160 and an optional user interface 180. The user interface 180 may be a stationary user interface, providing interaction with the issue list located on the storage device 160 for those not located on the site 120, or for those users not located on the site for which they presently wish to obtain issue list information. The user interface 180 may be a graphical user interface or text-only or other some other type of user interface and may optionally include one or more input devices, such as a keyboard or mouse. The user interface 180 may also include an output device, such as a printer. Examples of users that may interact with the user interface 180 include, by way of non-limiting example, architects, construction managers, consulting engineers, contracting officers, designers, builders, general contractors, owners, owners' representatives, project managers, subcontractors, vendors, and IT specialists tasked with maintaining the implementation 100.

Information available from the user interface 180 and/or mobile computing device 140 may include, but is not limited to, reports, and other interactive views of existing issues and defects to monitor ongoing project status, attach comments, change statuses and otherwise provide management comment and oversight. Optionally, a download or export of the data may be provided from a given project into an external system in a file or report format. The user interface may optionally be multi-lingual.

According to an example, an embodiment of the invention may provide an interactive functionality to allow users to provide comments, and view comments by others, regarding a specific component of the project. The comments, as noted above, may be provided with a date/time stamp and may optionally include text, audio or other recording (photo, video). While not limited to these examples, the comments can be a brief description of the work to be completed or corrected, reasons why the work is not complete, recording to establish a record of what must be done and/or a record of what was completed. Use of the RF identifier associated with both the project component and each of the comments can provide a powerful organizational tool, enabling a wide variety of parties to have input to the process of defining/describing the work items and the process of working on and resolving the work items, regardless of where the parties are located. According to the example, the parties can communicate regarding a large number of project components, even though the parties may not be near the project component, or even on the work site, at the same time. Communication can be in the form of a real-time conversation through the use of the comments, or by the posting of comments by one party and the reply through later comments posted by another party.

Figure 2:
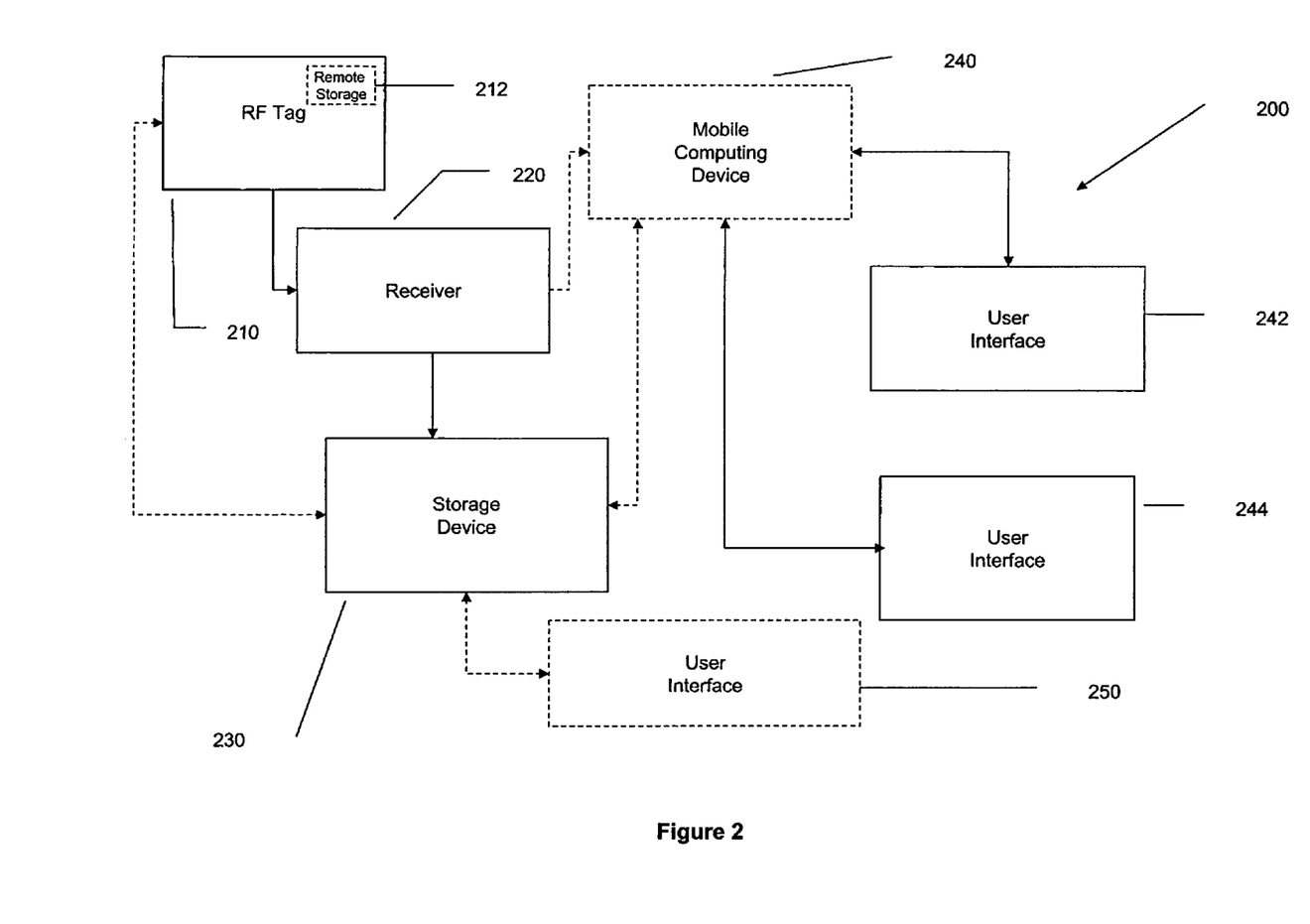
FIG. 2 is a schematic illustration of an illustrative embodiment of a system for field administration of a project, according to an illustrative embodiment of the invention.

As illustrated in FIG. 2, a system 200 is illustrated by way of example according to an embodiment of the invention. The system 200 can be used for field administration of a project. The system 200 includes one or more radio frequency tags 210 that may optionally include a remote storage capability 212. As described above in relation to FIG. 1, An RF tag is provided with a unique identifier and is capable of transmitting the unique identifier, and optionally additional information, by a radio frequency transmission. A receiver is capable of receiving the identifier transmitted via the radio frequency transmission. The receiver 220 may communicate with a storage device 230. The storage device 230 is configured for storing an issue list. The issue list, as discussed above in relation FIG. 1, may include details regarding one or more physical components of the project. The information in the issue list is configured so that the information pertaining to a particular component of the project correspond to the unique identifier of the radio frequency tag 210 that is affixed to that component. A mobile computing device may optionally be provided for communication with the receiver 220 and/or the storage device 230. The mobile computing device 240 may optionally provide one or more user interfaces 242, 244 to display information and/or receive information input by user. Such information may relate to a wide variety of items, such as the issue list located on the storage device 230, data located on the mobile computing device 240 but not yet transmitted to the issue list of the storage device 230 and/or unique identifiers or other information corresponding to the physical objects of the project, the RF tags 210 and/or the optional remote storage 212 located on one or more RF tags 210.

Figure 3:
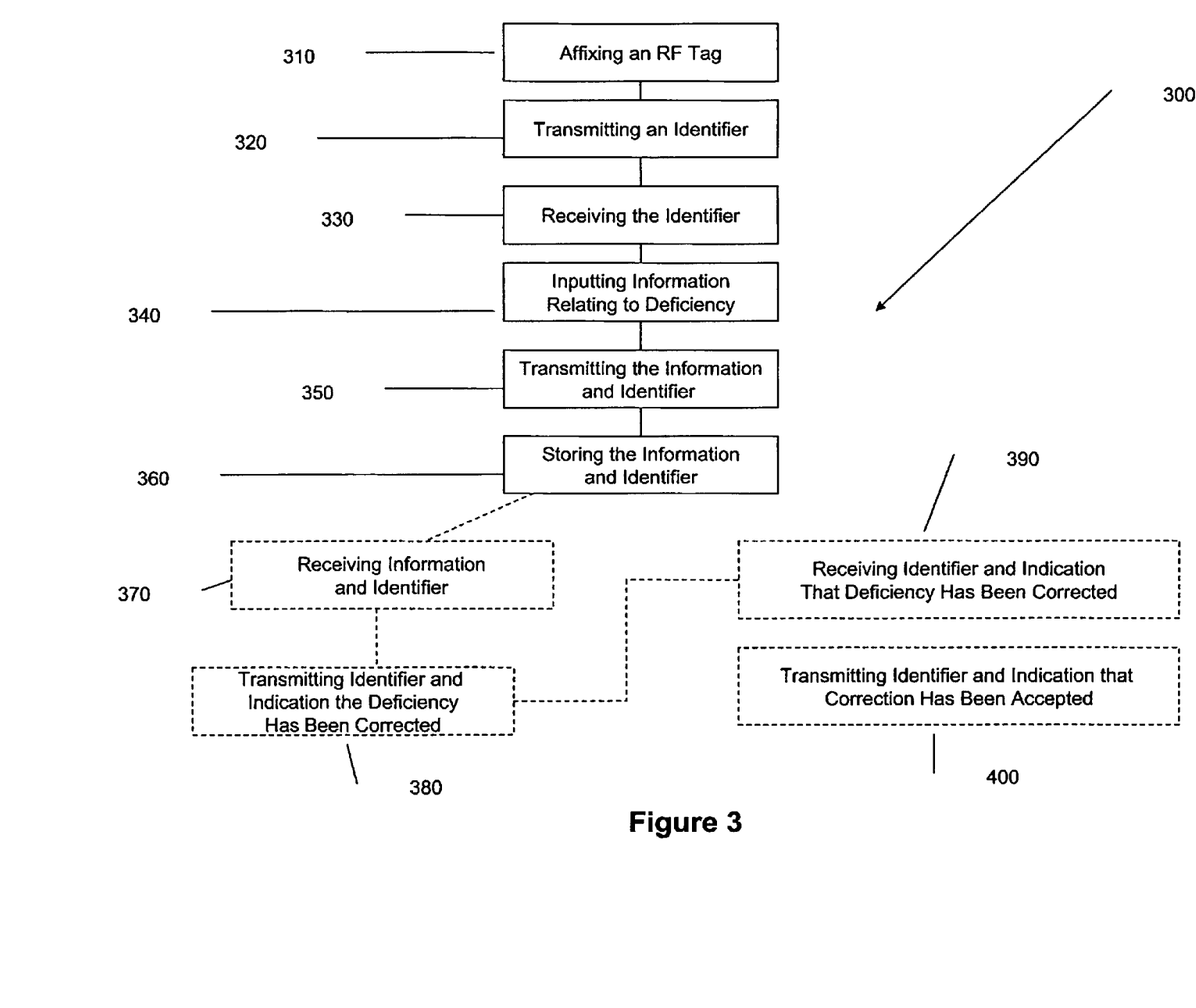
FIG. 3 illustrates a method of field administration of a project according to an illustrative embodiment of the invention.

As illustrated by way of example in FIG. 3, a method 300 of field administration of a project is illustrated by way of example. An RF tag is affixed 310 to a physical component of the project. The RF tag has an identifier so as to distinguish it from other RF tags. The identifier is transmitted 320 from the RF tag via a radio frequency transmission. The identifier is received 330 at a first mobile computing device. By way of example, the first mobile computing device may be used by an architect, engineer or other person responsible for inspection of the project and/or insuring quality control of the project.

Information is input 340 into the first mobile computing device. The information relates to a deficiency in the physical component of the project and is associated with the identifier of the RF tag that is affixed to the physical component of the project. The information and identifier are transmitted from the first mobile computing device to a storage device. The information and identifier are stored 360 in the storage device.

Optionally, the information and identifier may be received 370 at a second mobile computing device. The identifier and an indication that the deficiency has been corrected may be transmitted 380 to the storage device from the second mobile computing device. By way of example, the second mobile computing device may be used by a worker that is mending or addressing the deficiency of the physical object of the project.

Further optionally, the identifier and the indication that the deficiency has been corrected may be received 390 at a third mobile computing device. The identifier and an indication that the correction of the deficiency has been accepted may be transmitted 400 from the third mobile computing device. The third mobile computing device may, for example, be used by a user responsible for inspecting work done to mend previously identified deficiencies, such as a supervisor,. an owner, and/or a person responsible for quality control of the project.

It is within the scope of the invention that the first, second and third mobile computing devices may be a single piece of hardware. By way of example, a single tablet personal computer could be used by two or three different parties, such as for example an architect, a worker and later an owner or other final approval authority. Optionally, the mobile computing device may provide for different login or other authentication procedures so as to confirm the identity of the user thereby preventing improper or unauthorized entries by an inappropriate user. In other implementations, more than one mobile computing device may be used, including when each party has their own mobile computing device.

Figure 4:
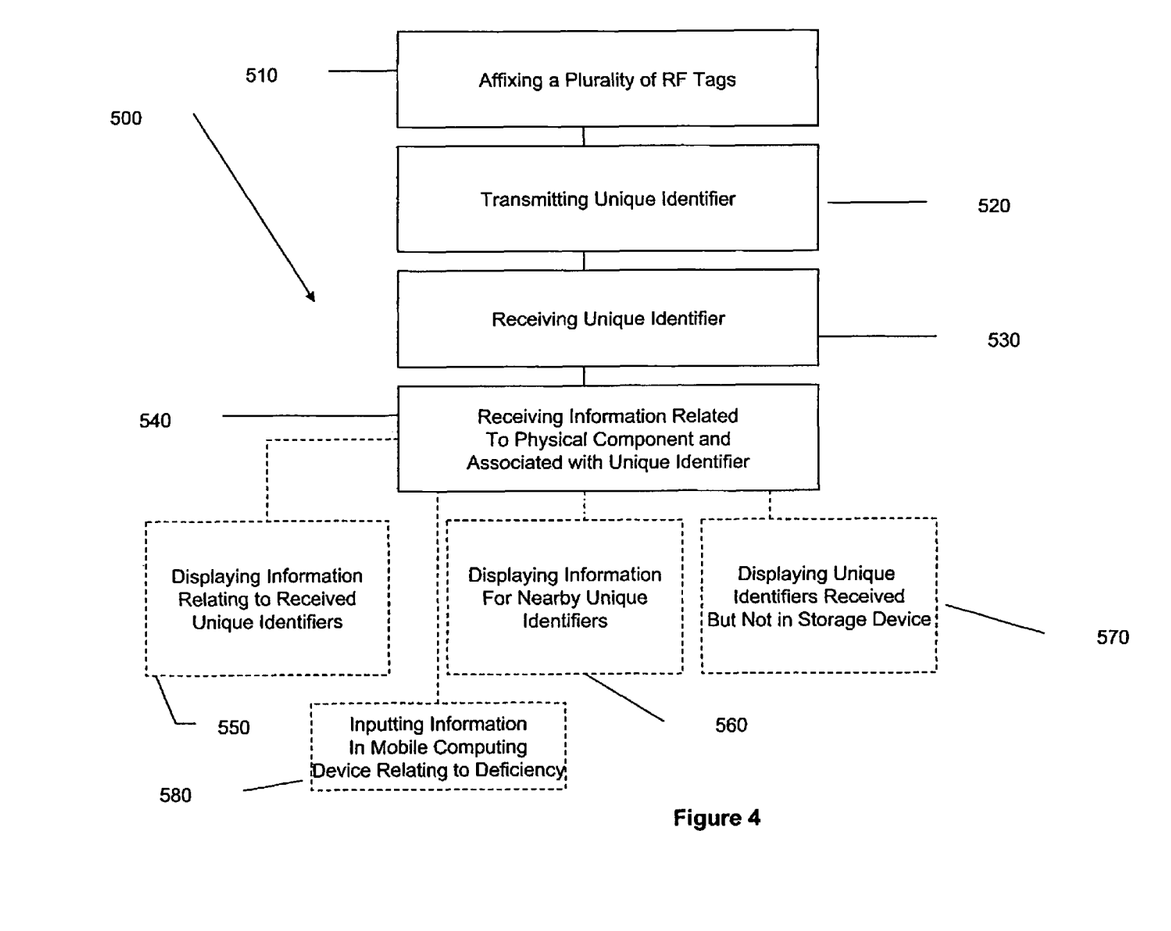
FIG. 4 illustrates another embodiment of a method of field administration of a project according to the invention.

FIG. 4 provides an illustration of a method 500 for field administration of a project according to another illustrative embodiment of the invention. According to this method 500, a plurality of RF tags are affixed 510 to a plurality of physical components of the project. Each tag has a unique identifier and is capable of transmitting the unique identifier. The unique identifier is transmitted 520 from at least one RF tag of the plurality of tags. The unique identifiers transmitted via a radio frequency transmission. It is understood that the transmission/reception of an identifier may occur before the RF tag is initially affixed to the physical component of the project. The unique identifier is received 530 at a first mobile computing device. It is understood that a mobile computing device may optionally include a receiver and/or may receive the identifier via an external receiver in communication with the mobile computing device. Information relating to the physical component of the project and associated with the unique identifier is received 540 from a stationary storage device.

Optionally, the method 500 may also include displaying 550 information relating to each of the unique identifiers received at the first mobile computing device. In this example, the information is displayed on the mobile computing device. In one example, a user may enter a given location via an input device on the mobile computing device and/or a user interface and access the list of all current issues and defects for that location as based on the issue list. Alternatively or in addition, a remote storage 212 may be read to determine the RF tag's data of deficiencies from the RF tag's identifiers received by a mobile computing device. In one implementation, this could be limited to a room, floor, area, or component in the project. With an omni-directional RF antenna, signal strength filtering could be used. By the use of a directional RF receiver, such as some RF pens, RF tags in a specific direction or area may be detected, with or without signal strength filtering.

Also optionally, information pertaining to each of the unique identifiers that are believed, by reason of the issue list information, to be proximate to the mobile computing device, but whose unique identifiers are not received at the mobile computing device via a radio frequency transmission, may be displayed 560. It is understood that describing the reception of a radio frequency transmission at the mobile computing device includes the configuration in which a receiver is integrated with the mobile computing device and also the configuration in which an external receiver is used in conjunction with the mobile computing device.

In a further optional variation, unique identifiers that are received at a mobile computing device via a radio frequency transmission but are not stored in the storage device, may be displayed 570. Such a display could provide for an inventory check, showing those RF tags located on the work site within radio frequency range of the mobile computing device but not entered into the issue list located on the stationary storage device.

In another optional variation, information may be input 580 into the first mobile computing device. The information may relate to a deficiency in the physical component of the project and associated with the identifier corresponding to the physical component of the project.

Figure 5:
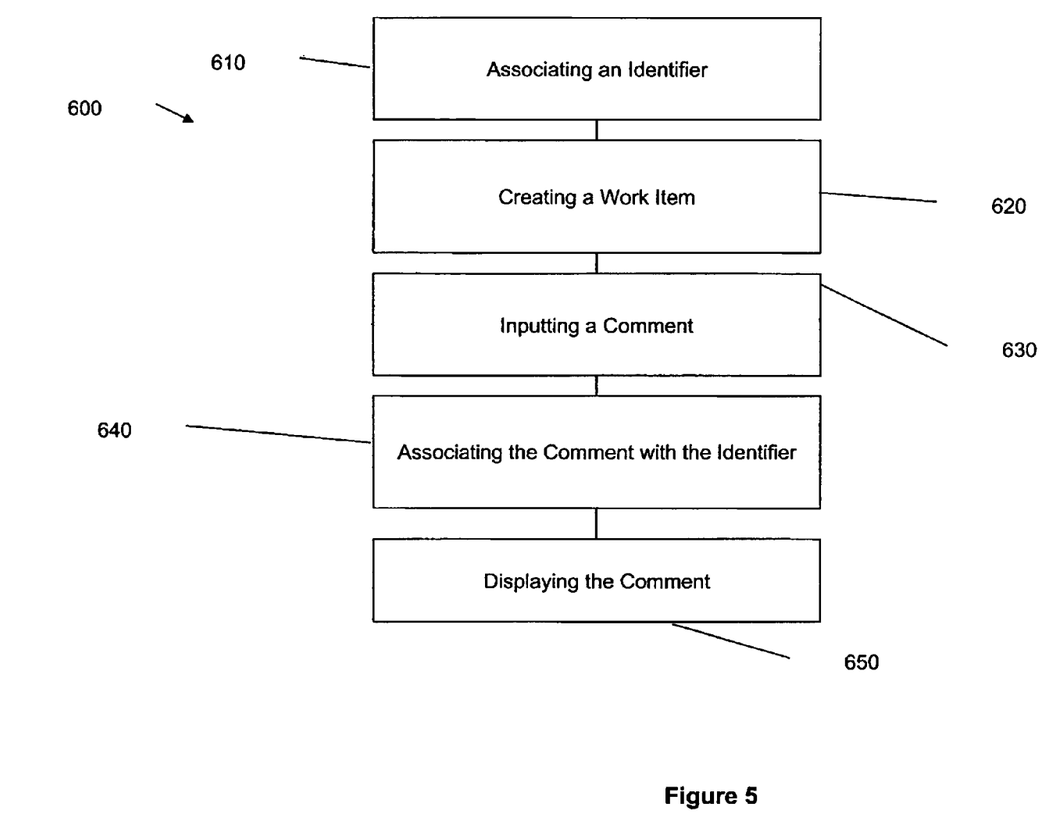
FIG. 5 illustrates another embodiment of a method of field administration of a project according to the invention.

FIG. 5 provides an illustration of another embodiment of the invention. The method 600 includes associating 610 an identifier of a radio frequency tag to a physical component of the project and creating 620 a work item on an issue list. The work item is associated with the identifier and related to a deficiency in the physical component. A first comment corresponding to the work item is input 630. The first comment is associated 640 with the identifier. The method also includes displaying 650 the first comment in relation to an inquiry pertaining to the identifier.

The method optionally further includes, after the act of inputting, transmitting the identifier and the first comment from a first mobile computing device to a storage device. Also, before the act of displaying, transmitting the identifier and the first comment from the storage device to a second mobile computing device.

The method may optionally include inputting a second comment corresponding to the work item and associating the second comment with the identifier. In this example, the first comment and the second comment are displayed in relation to an inquiry pertaining to the identifier.

The method may optionally include the act of affixing the tag to the physical component.

It is understood that various embodiments of the present invention may be implemented by the use of software run on various devices, such as mobile computing devices, storage devices, RF tags, networking components, and/or other computers that may be used to provide user interfaces or other output and/or export functionalities. It is further understood that the present invention is not limited to the use of software to implement the systems or methods of the invention. Other non-limiting examples of ways to implement various embodiments of the invention can include firmware, Read Only Memories (ROMs), Programmable Read Only Memories (PROMs), Electrically Erasable Programmable Read Only Memories (EEPROMs), Application-Specific Integrated Circuits (ASICs) and other hard-wired circuits.

According to the various methods of the invention, the information may optionally include a sound recording, text and/or a photograph or other graphical image. Sound recordings may optionally be processed using voice processing capabilities to convert the voice data into textual data that is instead or in addition to the sound recording, saved to the issue list. The voice processing may optionally be multi-lingual. The information stored may relate to work to be performed on the physical component of the project associated with the RF tag affixed to that component. A storage device, including stationary storage devices, may store information such that a user is restricted from accessing at least a portion of the information not related to the user's portion of the project. In addition or alternatively, the storage device may store information such that the user is restricted from accessing and/or modifying at least a portion of the information not related to the user's role in the project.

Various embodiments of the invention may include additional features, such as features described in relation to other embodiments or implementations. Other features include various alarms, for example, a user may locate an RF tag that is already in place by pointing a mobile computing device in the area of the RF tag and having the mobile device make a noise or create a signal of some kind. Additional features may be provided within the scope of the invention, for example, a user may choose a certain data value from a list of available options and other users may view those options in their native language—the software may support user-level personalization to the users preferred language, currency and locale. Information links between identifiers and an extranet or shared database may enable: harmonization of data; coordination of work; real-time communication between the construction and/or capital project site and any party connected via mobile computing device, via extranet, and/or via the Internet; proactive notification to the responsible party or stakeholder; record locations of physical work via Global Positional System (GPS), General Radio Packet System (GRPS), and Global System for Mobile Communications (GSM); automatic alerts on the status of the work; periodic and/or scheduled updates of the status of the mending of the deficiencies; and a broad spectrum of other beneficial features described herein. Two- and/or three-dimensional digital drawings or "maps" of the site may also be used within the scope of the invention site that identify the physical location in real space of the components of the projects associated with the RF tags.

Figure 6:
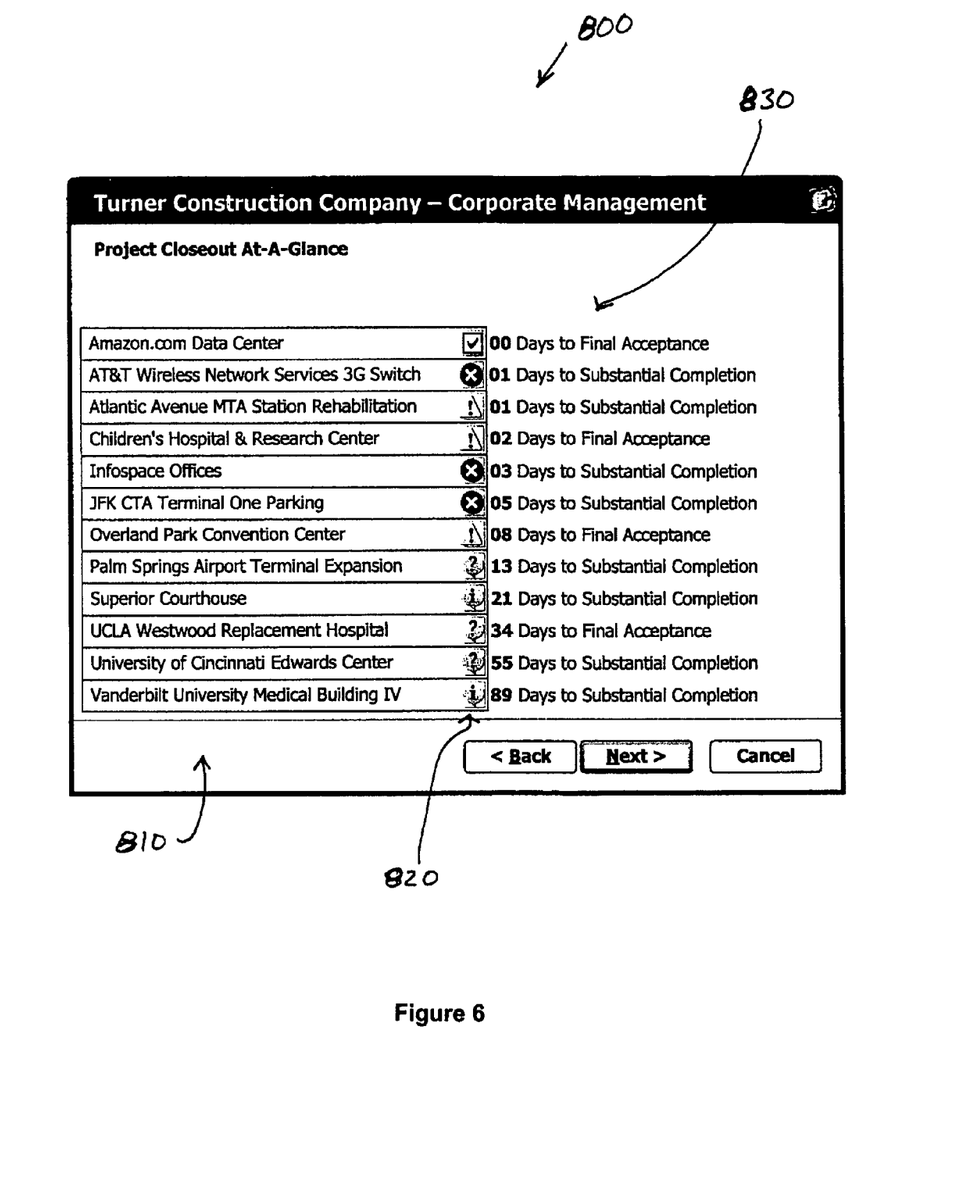
FIG. 6 illustrates a screen shot of a graphical user interface according to an embodiment of the invention.

FIG. 6 illustrates an example of a user interface 800 providing a project closeout at a glance. This example illustrates a variety of deficiencies 810, or categories of deficiencies with status icons 820 and indications 830 of days to the next milestone, e.g. substantial completion or final acceptance. This user interface provides a top-level summary of data in the issue list of the example.

The illustrative embodiments, implementations and examples herein are meant to be illustrative and not limiting. The present invention has been described by way of example, and modifications and variations of the exemplary embodiments will suggest themselves to skilled artisans in this field without departing from the spirit of the invention. Features and characteristics of the above-described embodiments may be used in combination. The preferred embodiments are merely illustrative and should not be considered restrictive in any way.

What is claimed is:

1. A system for administrating the construction of a facility, comprising:
    a radio frequency tag having an identifier and adapted to be affixed to at least one physical component of the facility, the physical component of the facility having at least one deficiency, the radio frequency tag for transmitting the identifier via a radio frequency transmission;
    a receiver for receiving the identifier transmitted via a radio frequency transmission;
    a storage device storing an issue list, the issue list comprising at least one work item corresponding to the deficiency in the physical component of the facility on which the radio frequency tag is affixed, the at least one work item includes any one or more of the following: site work, elevator work, stair work, structural work, roofing work, exterior work, hardware work, plumbing work, mechanical work, electrical work, carpentry work, and finishing work;
    a first user interface to enable a first party to view the at least one work item and indicate completion of an activity corresponding to the at least one work item, thereby signifying closure of the at least one work item; and a second user interface to enable a second party to view a status of the at least one work item after the first party indicates completion of the activity corresponding to the at least one work item, and either accept or reject the closure of the at least one work item, wherein upon an acceptance or rejection of the at least one work item by the second party, the issue list is updated to reflect the acceptance or rejection of the completion of the at least one work item.

2. The system of claim 1, further comprising: a mobile computing device for receiving the identifier from the receiver and communicating with the storage device to modify at least one attribute of the at least one work item on the storage device and receive information regarding the issue list, using the identifier received to associate the physical component of the facility to a corresponding portion of the issue list.

3. The system of claim 2, wherein the first user interface and the second user interface are presented on the mobile computing device.

4. The system of claim 1, wherein the radio frequency tag transmits the identifier upon receipt of an interrogation signal.

5. The system of claim 1, wherein the radio frequency tag further comprises a remote storage device, the remote storage device configured to store a plurality of attributes relating to the at least one work item corresponding to the deficiency in the physical component of the facility on which the radio frequency tag is affixed.

6. The system of claim 5, wherein the radio frequency tag is adapted to communicate directly with the storage device to synchronize the remote storage device with the storage device.

7. The system of claim 1, further comprising a third user interface in communication with the storage device and configured to receive information from the issue list, modify the issue list and add items to the issue list.

8. The system of claim 7, wherein the user interface is in communication with the storage device by way of the Internet.

9. A method for administrating the construction of a facility, comprising:
    affixing a radio frequency tag having an identifier to a physical component of the facility, the physical component of the facility having at least one deficiency and corresponding to at least one work item, the work item includes any one or more of the following: site work, elevator work, stair work, structural work, roofing work, exterior work, hardware work, plumbing work, mechanical work, electrical work, carpentry work, and finishing work;
    transmitting the identifier from the radio frequency tag via a radio frequency transmission;
    receiving the identifier at a first mobile computing device;
    inputting information into the first mobile computing device relating to the deficiency in the physical component of the facility, the information being associated with the identifier;
    transmitting the information and the identifier from the first mobile computing device to a storage device;
    storing the information and identifier in the storage device;
    receiving the information and the identifier from the storage device at a second mobile computing device after the first mobile computing device transmits the information and the identifier to the storage device;
    transmitting the identifier and an indication that the deficiency has been corrected to the storage device from the second mobile computing device;
    receiving the identifier and the indication that the deficiency has been corrected at a third mobile computing device; and
    transmitting, from the third mobile computing device, the identifier and an indication that correction of the deficiency has been accepted or rejected, wherein upon acceptance or rejection, the storage device is updated to reflect the acceptance or rejection of the correction of the deficiency.

10. The method of claim 9, wherein the information includes a sound recording.

11. The method of claim 9, wherein the information includes a photograph.

12. A method for administrating the construction of a facility, comprising:
    affixing a plurality of radio frequency tags each having a unique identifier to a plurality of physical components of the facility, the physical component of the facility having at least one deficiency, each tag for transmitting the unique identifier;
    transmitting the unique identifier from at least one radio frequency tag of the plurality of radio frequency tags via a radio frequency transmission;
    receiving at least one unique identifier at a first mobile computing device;
    receiving from a stationary storage device, information relating to the deficiency in the physical component of the facility and associated with the at least one unique identifier;
    displaying on the first mobile computing device, the information relating to each of the at least one unique identifiers received at the first mobile computing device;
    inputting the information into the first mobile computing device relating to the deficiency in the physical component of the facility and associated with the at least one unique identifier; and
    enabling a second mobile computing device to view the information and accept or reject the deficiency after the first mobile computing device indicates the deficiency in the physical component of the facility, wherein upon an acceptance or rejection of the deficiency by the second mobile computing device, the stationary store device is updated to reflect the acceptance or rejection of the deficiency in the physical component of the facility.

13. The method of claim 12, further comprising displaying the information pertaining to each of the unique identifiers that location details stored on the storage device signify should be proximate to the mobile computing device, but whose unique identifiers are not received at the mobile computing device via a radio frequency transmission.

14. The method of claim 12, further comprising displaying the unique identifiers that are received at the mobile computing device via a radio frequency transmission, but are not stored on the stationary storage device.

15. The method of claim 12, wherein the information relates to work to be performed on the physical component of the facility associated with the radio frequency tag affixed to the physical component.

16. The method of claim 12, wherein the stationary storage device stores the information such that a user is restricted from accessing at least a portion of the information not related to the user's portion of the construction of the facility.

17. The method of claim 12, wherein the stationary storage device stores the information such that a user is restricted from accessing at least a portion of the information not related to the user's role in the construction of the facility.

18. The method of claim 12, wherein the stationary storage device stores the information such that a user is restricted from modifying at least a portion of the information not related to the user's role in the construction of the facility.

19. A method of administrating the construction of a facility, comprising:
   associating an identifier of a radio frequency tag to a physical component of the facility, the physical component of the facility having at least one deficiency;
   creating at least one work item on an issue list, the work item associated with the identifier and related to the deficiency in the physical component of the facility, the at least one work item includes any one or more of the following: site work, elevator work, stair work, structural work, roofing work, exterior work, hardware work, plumbing work, mechanical work, electrical work, carpentry work, and finishing work;
   inputting a first comment corresponding to the at least one work item into a first mobile computing device;
   associating the first comment with the identifier;
   transmitting the identifier and the first comment from the first mobile computing device to a storage device;
   transmitting the identifier and the first comment from the storage device to a second mobile computing device; and
   displaying the first comment in relation to an inquiry pertaining to the identifier on the second mobile computing device after the first comment is inputted into the first mobile computing device.

20. The method of claim 19, further comprising:
   inputting a second comment corresponding to the at least one work item;
   associating the second comment with the identifier; and
   displaying the first comment and the second comment in relation to an inquiry pertaining to the identifier.

21. The method of claim 19, further comprising affixing the tag to the physical component.

* * * * *